United States Patent [19]
Zeuner et al.

[11] 3,977,649
[45] Aug. 31, 1976

[54] NORMALLY CLOSED SOLENOID OPERATED VALVE ASSEMBLY WITH RELIEF FUNCTION

[75] Inventors: Kenneth W. Zeuner, Newtown; Alonzo B. Jarman, Wrightstown, both of Pa.

[73] Assignee: Control Concepts, Inc., Newtown, Pa.

[22] Filed: Sept. 4, 1975

[21] Appl. No.: 610,291

Related U.S. Application Data

[63] Continuation of Ser. No. 387,606, Sept. 24, 1973, abandoned, which is a continuation-in-part of Ser. No. 257,532, May 30, 1972, abandoned.

[52] U.S. Cl. ................................. 251/82; 251/129
[51] Int. Cl.² ........................................ F16K 31/42
[58] Field of Search ..................... 251/76, 82, 129

[56] References Cited
UNITED STATES PATENTS

| | | | |
|---|---|---|---|
| 959,618 | 5/1910 | Schmidt | 251/76 |
| 2,121,657 | 6/1938 | Fisher | 251/129 X |
| 3,420,493 | 1/1969 | Kraft | 251/82 |
| 3,737,141 | 6/1973 | Zeuner | 251/129 |

*Primary Examiner*—Henry T. Klinksiek
*Attorney, Agent, or Firm*—Allan Ratner

[57] ABSTRACT

A normally closed solenoid operated valve assembly having a poppet movable between a valve normally closed position seating in and closing in orifice and a valve normally open position. A movable armature has a reduced section for engaging and pulling the poppet to the open position. A range spring tends to bias the poppet closed until the upstream force of fluid is sufficient to overcome the spring force. The spring force may be adjusted to vary to a predetermined value the upstream force of fluid. To open the valve, a solenoid is energized to move the armature thereby to move the poppet to the open position.

7 Claims, 4 Drawing Figures

U.S. Patent  Aug. 31, 1976  3,977,649
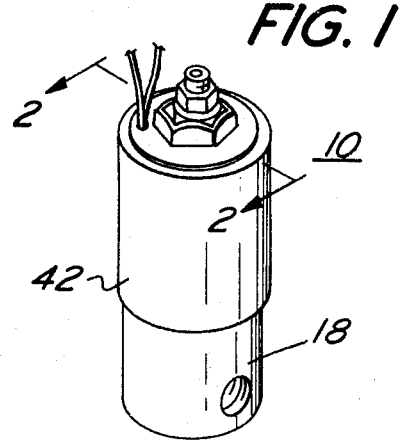
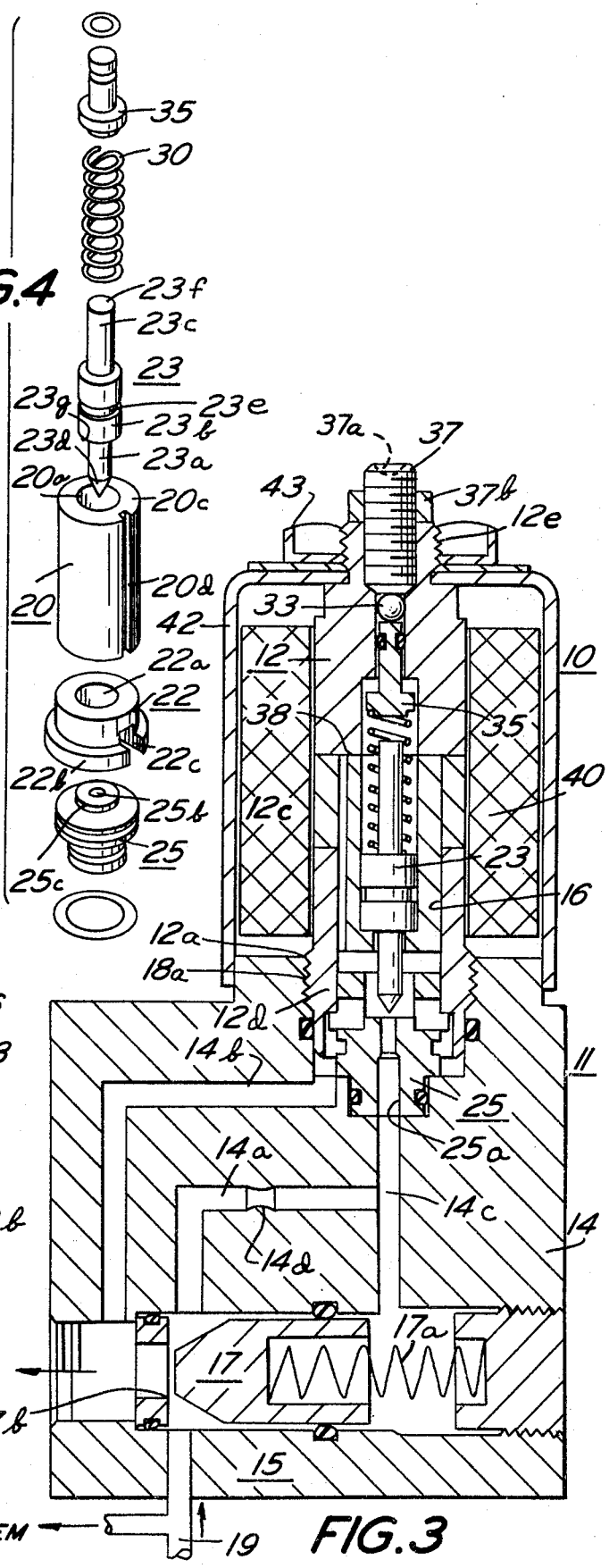

The spring force of range spring 30 may be adjusted by means of the up or down movement of plunger 35. Plunger 35 is received within chamber 16b with the upper end of the plunger engaging a steel ball 33. Ball 33 is held in place by a set screw 37 threadily received in chamber 16b and secured against rotation by a jamb nut 37b. The upper end of screw 37 extends out of chamber 16b and has an upper opening 37b adapted to receive a wrench for manual rotation of the screw. Accordingly, spring 30 may be adjusted in spring force by rotating screw 37 clockwise for increased spring force and counter-clockwise for decreased spring force.

For a source of magnetic flux, there is provided a hollow elongated cylindrically shaped electromagnet 40 which receives in a central opening sleeve assembly 12. A cup-shaped cover 42 encloses and protects electromagnet 40 and extends down to valve body 18 and encloses an upper portion thereof. Cover 42 has a central opening for receiving therein an upper threaded portion 12e of sleeve section 12b. Cover 42 is secured in place by a nut 43 which threadedly engages the threads of portion 12e. Cover 42 as well as armature 20, stop 22, poppet 23 and body 18 are formed of high magnetically permeable material (ferromagnetic).

The circuit of magnetic flux lines produced by electromagnet 40 when energized may be traced as follows. The flux lines flow down through sleeve section 12b and then from pole piece surface 17 and air gap 45 to armature 20 and poppet 23. The flow continues from armature 20 and poppet 23, to sleeve section 12d, body 18 and cover 42 with the circuit being completed to section 12b. As previously described, sleeve section 12c is made of very low magnetically permeable material, extends from pole piece face 38 substantially below (and the area generally adjacent) air gap 36 so that section 12c provides a gap to the circuit greater than that of gap 36. Accordingly, the circuit of flux lines is directed and concentrated through air gap 36.

With valve 10 in its normally closed state, range spring 30 is effective to apply a closing force to poppet 23 with poppet valve plug 23d seated within orifice 25b. It will be understood that the spring force of range spring 30 must be greater than the force produced at orifice 25b by the pressure of the fluid in order that the poppet close the orifice and maintain it closed. In this manner, orifice 25b is maintained closed by the range spring which has an effective spring force sufficient for the relief function. Specifically, if the force of the fluid at inlet 18b, channel 25a and orifice 25b is sufficient to overcome the spring force of range spring 30, then the relief function is provided. If a higher relief pressure is desired or a lower relief pressure is desired, the spring force of spring 30 may be increased or decreased respectively by means of adjusting said screw 37 in the manner previously described.

Upon energization of electromagnet 40, the magnetic flux lines are effective to produce a strong attractive force between pole piece face 38 and the upper annular surface 20c of armature 20. The attractive force therebetween is of sufficient value to attract armature 20 to face 38. With the upward movement of the armature, section 20b engages shoulder 23g thereby pulling or forcing plug 23d upward from orifice 25b against the closing force. In its final position, (as illustrated in FIG. 3) armature 20 contacts and is seated against face 38.

When electromagnet 40 is deenergized, spring 30 pushes poppet 23 towards orifice 25b and the poppet then impacts on section 20b thereby pushing armature 20 away from face 38. Spring 30 has sufficient force to break the residual magnetism between face 38 and armature 20 and to close the poppet against the opposing force produced by the pressure of the fluid under the poppet.

It will be understood that if upstream fluid pressure is applied to inlet 18b and outlet 18c flows to tank, then valve assembly 10 may operate as a combination solenoid operated valve and relief valve.

With valve assembly 10 in its normally closed stage, when upstream pressure becomes greater than the selected value of relief pressure, then range spring 30 is compressed by the upstream pressure thereby providing the relief function. When there is no longer a requirement for fluid pressure to be used for work, the electromagnet is energized and upstream pump pressure is dumped to tank.

Referring now to FIG. 3, there is shown a normally closed solenoid operated two stage valve assembly 11 which comprises valve assembly 10 as the first stage and a valve assembly 15 as the second stage. Valve assembly 10 of FIG. 3 is similar to that shown in FIGS. 1, 2 and 4 and previously described except that valve body 18 has been replaced by a valve body 14 which houses second stage 15. Normally closed assembly 10 controls second stage 15 to also be normally closed with the closed state shown in FIG. 2 and the open state shown in FIG. 3.

Assembly 15 may be any suitable valve assembly well known in the art comprising a poppet 17 and a spring 17a. In this application, upstream pressure is applied by way of a channel 19 through poppet 17. A flow channel 14a provides fluid flow from under poppet 17 through a flow restriction 14d and a flow channel 14c to a chamber above poppet 17. In addition, channel 14c is in fluid communication with chamber 25a of assembly 25. Further, channel 14b provides fluid communication from above poppet plug 23d, chamber 22a, opening 22c and then to tank.

The use of a second stage assembly allows higher valued pressure flow to be applied under poppet 17. By the use of restriction 14d, which is effectively a pressure divider, the pressure applied by way of channel 14c above poppet 17 and also to orifice 25b is an intermediate pressure. Restriction 14d and the areas above and below poppet 17 are selected so that with valve assembly 10 in its closed state, second stage 15 is also closed. With first stage 10 in its open state (dumping intermediate pressure to tank) second stage 15 is also in its open state, dumping upstream pump pressure to tank. As well known in the art, this operation may be achieved by the area above poppet 17 being greater than the area under the poppet (differential areas) and with the intermediate pressure being selected to maintain the desired closing force on poppet 17.

In operation, with electromagnet 40 energized, valve 10 is in its illustrated open state which controls second stage 15 to its open state. It will be understood that spring 17a has a low valued spring force so that with valve 10 open, upstream pressure applied by way of channel 19 must still be able to at least overcome that spring force in order to be dumped to tank.

When electromagnet 40 is deenergized, poppet 23 closes orifice 25d and intermediate pressure at channel 14c is no longer being dumped to tank. Accordingly, spring 17a starts poppet 17 in motion to tend to close valve 15. As a result of the differential areas, there is an

NORMALLY CLOSED SOLENOID OPERATED VALVE ASSEMBLY WITH RELIEF FUNCTION

This is a continuation of application Ser. No. 387,606, now abandoned, filed Sept. 24, 1973, which in turn is a continuation-in-part of Ser. No. 257,532 now abandoned filed May 30, 1972.

BACKGROUND OF THE INVENTION

A. Field of the Invention

This invention relates to the field of normally closed solenoid operated valve assemblies.

B. Prior Art

It has been known in the prior art to use relief valves which are solely mechanically operated. By varying the preload on a spring in the relief valve, there is adjusted the amount by which the fluid would have to increase to open the valve. When the fluid pressure reaches a predetermined value, the valve opens and allows the fluid pressure to be relieved. In this manner, the valve is able to maintain a predetermined pressure. Such mechanically operated relief valves only maintain pressure at a predetermined value if the pressure is below that value but have no effect on fluid flow.

For high fluid volumes, it has been known to use such mechanical relief valves in combination with a second stage in which upstream pressure is applied under the poppet of the second stage. Upstream pressure is divided and applied above the poppet as an intermediate pressure. The mechanical relief valve is connected between tank and above the second stage poppet. Accordingly, when pressure above the poppet exceeds a predetermined value set by the mechanical relief valve, the second stage opens and allows upstream pressure to flow to tank. In addition, it has been known to remotely electrically dump the system by means of a normally closed solenoid valve connected above the second stage poppet. When actuated, the solenoid valve dumps intermediate pressure to thereby allow upstream pressure to flow to tank. However, this combination of a separate mechanical relief valve and a separate solenoid valve has left much to be desired since use of these two is not only cumbersome but also quite costly.

SUMMARY OF THE INVENTION

A normally closed solenoid operated valve assembly which provides a relief function. There is provided plug means movable between a valve normally closed position seating in and closing an orifice and a valve open position. A movable armature has a section for engaging and pulling the plug means to the valve open position. A range spring tends to bias the plug means to the closed position until the upstream force of fluid is sufficient to overcome the resilient force of the range spring. The spring force of the range spring is adjustable thereby to vary to a predetermined value the maximum value of the upstream force of fluid. The adjusting device and the range spring are disposed on the downstream side of the orifice. When a solenoid is energized, an electromagnetic attractive force moves the armature thereby to move the plug means from the closed to the open position.

BRIEF DESCRIPTION OF THE DRAWINGS

FIG. 1 is a perspective view of a normally closed solenoid operated valve assembly of the present invention;

FIG. 2 is a sectional view of the valve assembly of FIG. 1 in a valve normally closed position;

FIG. 3 is a sectional view of a valve assembly similar to that of FIGS. 1, 2 and 4 (in the valve open position) together with a second stage valve assembly; and FIG. 4 is an exploded view of many of the valve elements of FIG. 2.

DETAILED DESCRIPTION

Referring now to FIGS. 1, 2 and 4, there is shown a single stage normally closed solenoid operated poppet valve assembly 10. Valve assembly 10 comprises a tubular sleeve assembly or housing 12 having threads 12a formed on the outer surface of a lower sleeve section 12d. Threads 12a engage upper internal threads 18a of a valve body 18. Sleeve assembly 12 comprises a lower sleeve section 12d, a middle sleeve section 12c and an upper sleeve section 12b. Sections 12b and 12d are made of very high magnetically permeable material which is defined as ferromagnetic. On the other hand, section 12c is made of very low magnetically permeable material, such as for example, stainless steel. As shown, sections 12b–d are rigidly secured together as for example, by welding.

Sections 12b–d together provide an internal cylindrical chamber 16 for housing a tubular armature 20 and a tubular stop 22. Armature 20 has a cylindrical central chamber 20a and a reduced inner diameter section 20b. Stop 22 has a cylindrical central chamber 22a coaxial with chamber 20a. Armature 20 is slideably received within chamber 16 with the upper portion thereof being within section 12c and the lower portion thereof being within section 12d. Stop 22 nests in sealed relation within chamber 16 with a lower flange 22b of stop 22 engaging a lip formed in chamber 16. All of stop 22 is disposed within section 12d.

Secured between the bottom surface of stop 22 and valve body 18, is a control orifice assembly 25 having a central chamber 25a which is a fluid communication with a first flow channel 18b of valve body 18 as shown. Chamber 25a tapers upwardly to form at its upper end, an orifice 25b which provides a seat for a poppet or pilot 23. In order to provide proper alignment, orifice assembly 25 has a shoulder 25c which is received within chamber 22a and is coaxial therewith.

Poppet 23 is adapted to move axially within chambers 20a and 22a. Poppet 23 may be formed in one piece having a lower portion 23a, an intermediate or guide portion 23b and an upper portion 23c. Lower portion 23a terminates in a valve plug 23d. Guide 23b contacts and slides within chamber 20a and is dimensioned to assure proper alignment of plug 23d into and out of orifice 25d but is loose enough to allow fluid flow around the plug. A lower shoulder 23g of guide 23b is engaged by reduced section 20b when armature 20 moves upwardly. Section 20b has a larger inner diameter than the outer diameter of poppet portion 23a to avoid contact therebetween.

A range spring 30 is disposed between and engages an upper shoulder of guide 23b and a lower shoulder of an adjusting plunger 35 (later described in detail). Range spring 30 (range resilient means) applies a bias on poppet 23 pushing it against orifice 25b thereby closing the orifice for the normally closed position illustrated in FIG. 2. In this normally closed position, armature 20 is free to move between shoulder 23g and stop 22.

increase in pressure under the poppet. This pressure increase acts through channel 14a to then increase the intermediate pressure which tends to further push the poppet in a direction to close the valve. This further increases pressure under the poppet resulting in increased intermediate pressure tending to further close the valve. This operation continues until valve 15 is actually closed.

It will be understood that with stages 10 and 15 normally closed, that the intermediate pressure under poppet 23 cannot rise above a desired maximum predetermined value determined by the spring force of range spring 30. Specifically, as upstream pressure increases, the intermediate pressure increases until poppet 23 opens against the intermediate force. Thus poppet 17 allows upstream pressure to flow to tank until that pressure decreases sufficiently.

The foregoing operation may be further defined if it is assumed that upstream pressure is at a value which causes valve 10 normally closed to operate at its balance point, thereby maintaining the intermediate pressure in channel 14c. At this point, valve 10 continuously leaks in order to maintain the intermediate pressure. If for example a pressure spike is generated upstream, that spike is immediately applied under poppet 17. This spike moves the poppet and opens the second stage orifice. Since flow through restriction 14d is slow, intermediate pressure is always being maintained. Thus the spike is bled off to tank until the balance point of the second stage is again reached and poppet 17 again closes.

It will now be understood that both of the embodiments of FIGS. 2 and 3 comprise valve assembly 10 which assembly includes orifice assembly 25, stop 22, armature 20, poppet 23, spring 30 and plunger 35. As shown in FIGS. 2 and 3, a major portion of poppet 23 is received within armature 20 and at least a minor portion of range spring 30 (range resilient means) is also received with the armature. In addition, it will be seen that elements 22, 20, 23, 30 and 35 are all on the downstream (low pressure) side of orifice 25b. It is particularly important that range spring 30 and plunger 35 be downstream so that all of the resilient means be immersed within fluid of substantially the same temperature.

What is claimed is:

1. A solenoid operated valve assembly which is normally closed when unenergized for providing a relief function in which upstream pressure flows into an upstream flow channel and out of a downstream flow channel of said valve assembly comprising
    an orifice in fluid communication between said upstream and downstream flow channels,
    plug means movable between a valve normally closed state seating in and closing said orifice and a valve open state,
    a movable armature having (1) a chamber for slidably receiving a major portion of said plug means and (2) a section for engaging and pulling said plug means to said valve open state,
    a range spring having one end engaging only said plug means and tending to bias solely said plug means to said valve closed state until the upstream force of fluid is sufficient to overcome a preselected spring force of said range spring, at least a minor portion of said range spring being received within said armature chamber,
    pole piece means having a surface spaced from and forming a predetermined air gap with said armature when in said normally closed state, said pole piece means having a chamber for receiving therein a minor portion of said range spring and a minor portion of said plug means,
    solenoid means adapted to be energized for providing an electromagnetic attractive force between said armature and said pole piece means to move said armature thereby moving said plug means from said normally closed to said open state, and
    means for adjusting said range spring to said preselected spring force to vary to a predetermined value the maximum value of said upstream force of fluid thereby to provide said relief function, a portion of said adjusting means being received within said chamber, said adjusting means and said range spring disposed on the downstream side of said orifice.

2. The valve assembly of claim 1 in which said plug means includes a guide portion and in which said armature section is of reduced diameter for engaging said guide portion of said plug means.

3. The valve assembly of claim 2 in which there is provided pole piece means fixedly disposed between said armature and said orifice and having a chamber for receiving a minor portion of said plug means.

4. The valve assembly of claim 1 in which there is provided a housing for said armature and said plug means and forming said pole piece means, said housing being of very high magnetically permeable material except in the area generally adjacent said air gap.

5. The valve assembly of claim 4 in which said plug means comprises a poppet having said guide portion, a portion terminating in a valve plug, said guide portion having slide walls which contact said chamber of said armature and are dimensioned to provide alignment of said valve plug into and out of said orifice.

6. The valve assembly of claim 1 in which said adjusting means adjusts the spring force of said range spring and comprises a plunger received within said chamber of said pole piece means for engaging another end of said range spring.

7. The valve assembly of claim 6 in which there is provided screw adjustment means for raising or lowering said plunger with said screw adjusting means being accessible for turning from exterior of said valve assembly.

* * * * *